United States Patent [19]

Sewell

[11] Patent Number: 4,827,653

[45] Date of Patent: May 9, 1989

[54] DECOY WITH ANCHOR REEL

[76] Inventor: Jerry C. Sewell, Rt. 2, Box 110, Dodridge, Ark. 71834

[21] Appl. No.: 211,566

[22] Filed: Jun. 27, 1988

[51] Int. Cl.$^4$ ............................................ A01M 31/06
[52] U.S. Cl. .............................................. 43/3; 43/2
[58] Field of Search .......................................... 43/2, 3

[56] References Cited

U.S. PATENT DOCUMENTS

| 2,747,814 | 5/1956 | Taylor | 43/3 |
| 3,079,719 | 3/1963 | Muszynski | 43/3 |
| 3,704,538 | 12/1972 | Gagnon | 43/3 |
| 3,798,820 | 3/1974 | Dye | 43/3 |

Primary Examiner—Nicholas P. Godici
Assistant Examiner—Michael William Starkweather
Attorney, Agent, or Firm—John M. Harrison

[57] ABSTRACT

A decoy provided with a hollow keel on the bottom thereof for enclosing an anchor reel mechanism and selectively anchoring the decoy in a water body. The anchor reel mechanism is characterized by a spool which is rotatably mounted in a spool housing located the keel, with an anchor line wound on the spool and an anchor attached to the free end of the anchor line. The spool is rotatable in the spool housing to deploy the anchor on the water bottom and secure the decoy in hunting configuration and the anchor may be retracted into a shaped anchor receptacle in stored configuration by inserting a crank in one end of the spool and rotating the spool with the crank to wind the anchor line on the spool. A plug is threaded in the spool housing of the keel and is designed to selectively engage the spool and prevent deployment of the anchor when the decoy is in stored configuration. Loosening of the plug allows the anchor to fall from the anchor receptacle and the anchor line to deploy from the spool when the decoy is floated in the hunting configuration.

21 Claims, 1 Drawing Sheet

DECOY WITH ANCHOR REEL

BACKGROUND OF THE INVENTION

1. Field of the Invention

This invention relates to duck hunting and more particularly, to a specially designed decoy having an anchor reel mechanism built therein for selectively deploying an anchor on a water bottom, in order to tether the decoy in a selected floating location for hunting purposes. In a preferred embodiment, the decoy is fitted with a hollow keel on the bottom thereof, which keel encloses a spool housing designed to receive a rotatable spool having an anchor line wound thereon, with an anchor fitted to the free end of the anchor line, such that the anchor can be selectively deployed on the water bottom and retracted into an anchor receptacle, as desired. The retraction procedure is effected by using a hand crank, one end of which is inserted in a slot provided in the spool to wind the anchor line on the spool. A threaded plug is inserted in a threaded receptacle provided in the spool housing for selectively engaging the spool and preventing undesirable unwinding of the anchor line and deployment of the anchor from the keel when the decoy is stored. Loosening of the plug in the spool housing facilitates unwinding of the anchor line from the keel and deployment of the anchor in a water body to tether the decoy in a selected location while hunting.

One of the problems realized in the deployment and storage of duck and other waterfowl decoys is that of attaching and deploying the anchor line and anchor which are necessary to tether the decoy in a selected location on a water body. Anchor lines are normally attached to a flange on the flat bottom of the decoy and a strip of lead or other metal is attached to the opposite end of the anchor line to anchor the decoy and prevent the decoy from floating away from the proximity of the blind while duck hunting. When retrieved, the decoy is commonly grasped, the anchor line is wound around the decoy neck and the anchor is left unattached. The decoy is then normally placed in a burlap sack or other container along with other decoys and during the course of transprrtation and storage, the anchor lines and anchors frequently become entangled, thereby necessitating considerable energy and time to separate the decoys before the next hunting trip. An improved variation of this conventional anchor line and anchor deployment technique is the use of lead strips which are sufficiently long to wrap around the neck of the decoy after the anchor line is wound around the decoy neck to prevent, or at least minimize, entanglement of the respective anchor lines when the decoys are collected in a sack or container. However, since lead is a soft material, the bumping of the decoys together in the container sometimes dislodges the anchor from around the decoy neck and the line often becomes entangled with other anchor lines.

2. Description of the Prior Art

Various types of anchors for decoys are known in the art. Typical of these anchors is the Anchor For Decoys detailed in U.S. Pat. No. 2,589,913, dated Mar. 18, 1952, to F. W. Wenner. The anchor is characterized by a pair of substantially S-shaped jaw members which are reversely superimposed on each other with intermediate portions crossing each other, a pivot eye connecting the members medially to each other and an anchor line connected thereto for opening and closing the jaws at opposite sides of the pivot eye. In open position, the line is allowed to be reeled on and from the jaw members and when the jaw members are in the closed position, the line is retained thereon. A "Cord Reel" is detailed in U.S. Pat. No. 2,747,814, dated May 29, 1956, to R. S. Taylor. The cord reel includes a reel mechanism having a spring for automatically winding an anchor line thereon. The reel mechanism is typically suspended from the bottom of the decoy and the anchor line is wound thereon, with an anchor attached to the opposite end of the anchor line, such that the anchor line and anchor can be deployed from the reel against spring tension when the decoy is placed in a water body during hunting. Furthermore, when the decoy is retrieved, the anchor line is automatically wound on a drum inside the reel mechanism pursuant to spring tension and the anchor is retracted to a position immediately beneath the reel mechanism for storage purposes. U.S. Pat. No. 2,917,857, dated Dec. 22, 1959, to F. Muszynski, details a "Duck Decoy" provided with an internal spool which contains a length of anchor line, to which is attached an anchor. The spool mechanism is fitted with a disengageable clutch mechanism which facilitates free rotational movement of the anchor line storage reel with the clutch mechanism disengaged and permits the anchor line to be adjusted for any water depth. A spring facilitates rewinding of the anchor line on the spool and retrieving of the anchor to a position adjacent the bottom of the decoy when the decoy is to be stored. U.S. Pat. No. 3,079,719, dated Mar. 5, 1963, also to F. Muszynski, details a "Duck Decoy" which is similar to the duck decoy detailed in U.S. Pat. No. 2,917,857. The decoy is characterized by an internally-mounted spool and spring mechanism which includes a torsion spring and a trip apparatus to facilitate unwinding of an anchor line from the spool against the spring tension to a selected depth for anchoring the decoy in a water body and tripping the spring mechanism to rewind the anchor line on the spool and retract the anchor to the decoy during storage. A "Reel for Anchoring Wild Fowl Decoys" is detailed in U.S. Pat. No. 4,340,192, dated July 20, 1982, to James O. Burris, III. The reel is suspended inside the hollow interior of the decoy and includes a housing provided with a rotatable, spring-loaded spool containing a length of anchor line, to the end of which is attached an anchor. The reel is further provided with a trip mechanism, in order to facilitate extension of a selected length of line from the rotating drum or spool, deployment of the anchor in a selected depth in the water body to tether the decoy in a selected location and subsequent tripping of the trip mechanism to allow spring tension to rewind the spool and retrieve the anchor inside the decoy.

It is an object of this invention to provide a new and improved decoy having an anchor reel built therein, which anchor reel is characterized by a rotatable spool mounted in a keel extending from the bottom of the decoy, which spool is provided with a length of anchor line having an anchor attached to the free end thereof, the rotation of which spool is controlled by a threaded plug seated in the keel and designed to selectively engage the spool, control rotation of the spool and facilitate deployment of the anchor line and anchor to and from the keel.

Another object of this invention is to provide a waterfowl decoy having a keel mounted on the bottom side thereof, which keel is fitted with a spool housing containing a rotating spool, the rotation of which spool is controlled by a plug threaded in the spool housing for selective engagement with the spool, with an anchor line wound on the spool, in order to selectively deploy an anchor on a water bottom and tether the decoy in a selected location while hunting waterfowl.

Still another object of this invention is to provide a duck or goose decoy having a spool rotatably mounted in a spool housing provided in a hollow, bottom-mounted keel, which spool is provided with a length of anchor line having the free end attached to an anchor and further including a plug threaded in the spool housing for selectively engaging and disengaging the spool to deploy the anchor and subsequently rewind the anchor line on the spool by means of a removable crank mechanism which is adapted to engage the spool.

A still further object of this invention is to provide a duck decoy having a hollow keel which encloses a spool housing containing a rotatable spool having a slot provided therein for insertion of a crank, with an anchor line wound on the spool and an anchor attached to the free end of the anchor line, such that the anchor can be selectively deployed on the bottom of a water body by rotation of the spool and retrieved from the water body by insertion of the crank into engagement with the spool and rotation of the spool to rewind the anchor line on the spool and maintain the anchor in the keel, responsive to selectively loosening and tightening a plug threaded in the spool housing.

SUMMARY OF THE INVENTION

These and other objects of the invention are provided in a new and improved water fowl decoy having a hollow keel mounted on the bottom thereof, which keel encloses a spool housing containing a rotating spool having a length of anchor line wound thereon with an anchor line attached to the end thereof, the drum also fitted with a slot for receiving one end of a crank for winding the anchor line on the drum. Further included is a plug threaded into one end of the spool housing keel for selective engagement with the spool, in order to lock the spool in position with the anchor line fully deployed on a water bottom to tether the decoy in a selected position, or with the anchor fully retracted in the keel pursuant to rewinding of the anchor line on the spool using the crank.

DESCRIPTION OF THE DRAWING

The invention will be better understood by reference to the accompanying drawing, wherein.

DESCRIPTION OF THE PREFERRED EMBODIMENTS

Figure 1:
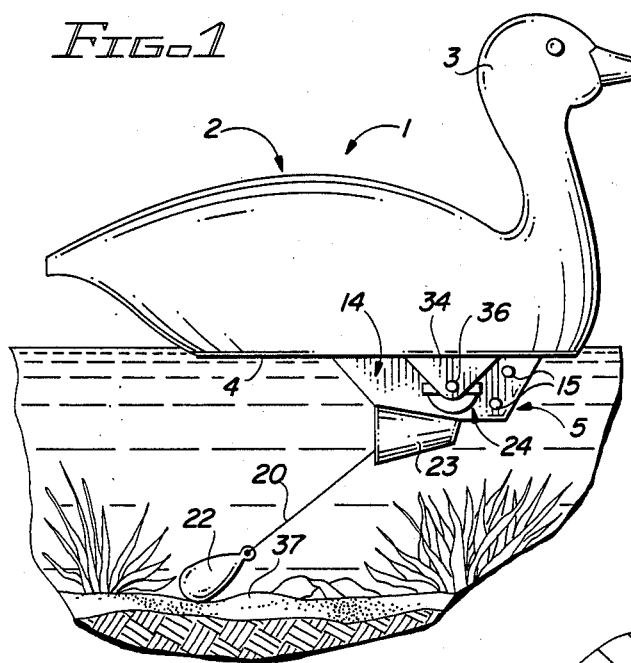
FIG. 1 is a side view of a preferred embodiment of the decoy with anchor keel deployed in anchored, hunting configuration.
Figure 2:
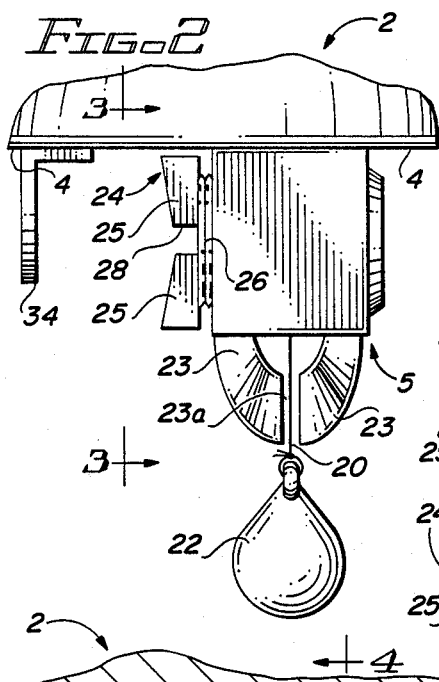
FIG. 2 is a front view of the decoy, with the anchor in partially deployed configuration beneath the keel.
Figure 3:
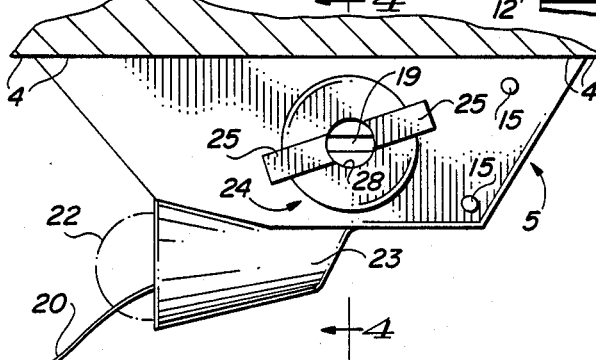
FIG. 3 is a sectional view taken along line 3—3 of the decoy and keel illustrated in FIG. 2.

Referring initially to FIGS. 1-3 of the drawing, a duck decoy is generally illustrated by reference numeral 1 and includes a shaped decoy body 2 which is configured to resemble a specific duck, according to the knowledge of those skilled in the art. The decoy body 2 is caracterized by an upwardstanding head 3, a flat bottom or base 4 for floating the decoy 1 and a hollow keel 5, secured to or formed integrally with the base 4, as illustrated. The keel 5 is further characterized by an internal spool housing 6, carrying a rotatable spool 16 and a pair of curved anchor receptacles 23 extending downwardly from the spool housing 6 in facing relationship to define an anchor line access 23a therebetween. An anchor line 20 is attached to the spool 16 at the anchor line seat 18a and projects through an anchor line slot 21, provided in the keel 5 and through the anchor line access 23a and an anchor 22 is secured to the extending end of the anchor line 20.

Figure 4:
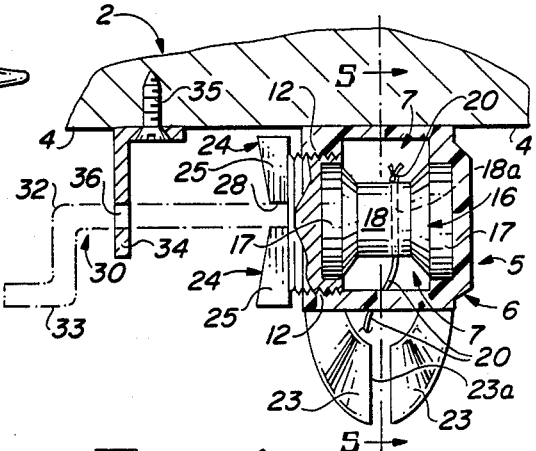
FIG. 4 is a sectional view taken along line 4—4 of the spool housing in the keel illustrated in FIG. 3.
Figure 5:
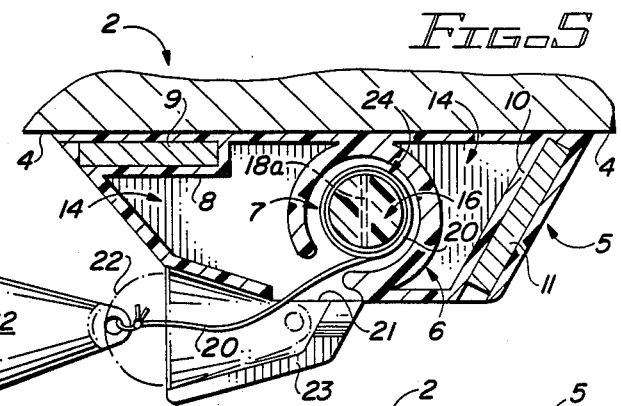
FIG. 5 is a sectional view taken along line 5—5 of the spool housing illustrated in FIG. 4.

Referring now to FIGS. 2-5 of the drawing, the keel 5 is further characterized by a keel cavity 14, a rear ballast compartment 8 and a front ballast compartment 10. In a preferred embodiment of the invention, a strip of rear ballast 9 is provided in the rear ballast compartment 8 and a front ballast 11 is provided in the front ballast compartment 10, in order to maintain the decoy body 2 in the upright, floating position illustrated in FIG. 1. In a most preferred embodiment of the invention, the rear ballast 9 and the front ballast 11 are characterized by lead strips which are glued or otherwise secured inside the rear ballast compartment 8 and the front ballast compartment 10, respectively. The spool housing 6 further includes a housing opening (not illustrated) and a circular anchor line cavity 7 between the spool housing 6 and the spool 16, as illustrated in FIGS. 4 and 5, to accommodate the anchor line 20, as hereinafter further described. In another preferred embodiment of the invention, the spool 16 includes a pair of spool flanges 17, separated by a recessed spool drum 18, which receives a quantity of the anchor line 20 wound thereon. One end of the anchor line 20 extends through the anchor line seat 18a, which is drilled or otherwise provided in the spool drum 18, while the opposite end of the anchor line 20 projects through the housing slot opening in the spool housing 6, the anchor line slot 21 in the keel 5 and the anchor line access 23a and is secured to the anchor 22. One end of the spool housing 6 is provided with internal housing threads 12, as illustrated in FIG. 4 and a spool plug 24 is provided with outwardly-extending plug wings 25 and with external plug threads 26 for engaging the housing threads 12 of the spool housing 6 and threadibly inserting the spool plug 24 in the spool housing 6 in alignment with the spool 16, as further illustrated in FIG. 4.

Figure 6:
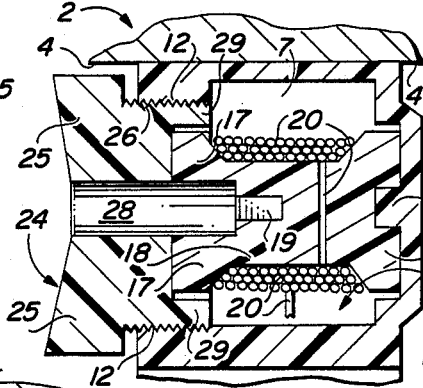
FIG. 6 is a front sectional view of the spool housing and spool plug, more particularly illustrating the spool in non-rotating configuration.
Figure 7:
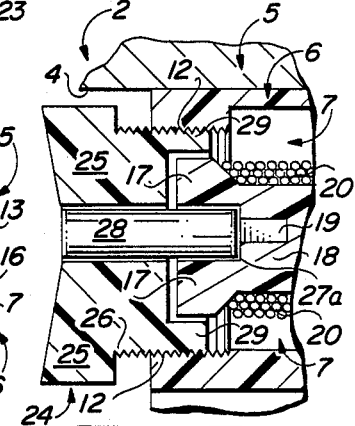
FIG. 7 is a front sectional view of the spool housing and spool plug, with the plug positioned in rotating configuration.
Figure 8:
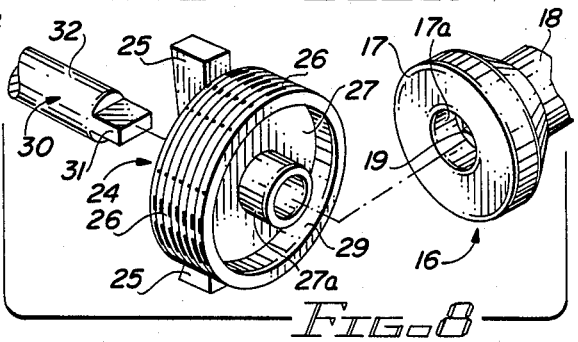
FIG. 8 is an exploded view of the spool, spool plug and crank elements of the decoy with anchor keel of this invention.

Referring now to FIGS. 4-8 of the drawing, in another most preferred embodiment of the invention the spool plug 24 is provided with a flat bearing face 27, illustrated in FIG. 8, which is bounded by the continuous plug flange 29 and coincides with the outside face of the spool flange 17 that faces the spool plug 24. Furthermore, a plug hub 27a projects from the center of the bearing face 27 and seats in a flange recess 17a provided in the corresponding spool flange 17. Accordingly, as illustrated in FIG. 6, when the spool plug 24 is fully threaded in the spool housing 6, the bearing face 27 engages the companion face located on the adjacent spool flange 17 located on the spool 16, to prevent the spool 16 from rotating inside the spool housing 6. Furthermore, as illustrated in FIG. 7, when the spool plug 24 is loosened in the spool housing 6, the bearing face 27 of the spool plug 24 is spaced from the companion face of the spool flange 17 and the spool 16 is rotatable inside the spool housing 6.

Referring again to FIGS. 4–8 of the drawings, in yet another preferred embodiment of the invention the spool 16 is rotatably mounted inside the spool housing 6 by operation of the plug hub 27a and the round spool guide 13, which extends from the opposite side of the spool housing 6 from the spool plug 24, into an oversized hole which is drilled in the center of the corresponding spool flange 17. Furthermore, as illustrated in FIG. 8, a crank tab slot 19 is provided in the flange recess 17a located in the opposite spool flange 17, which lies adjacent to the bearing face 27 of the spool plug 24 and a crank access opening 28 is provided in the spool plug 24 and extends through the plug hub 27a, for insertion of the crank shaft 32 of a crank 30 through the crank access opening 28. This insertion facilitates engagement of the flat-blade crank tab 31 with the corresponding crank tab slot 19, in order to rotate the spool 16 and wind the anchor line 20 on the spool drum 18 to retrieve the anchor 22 from a water bottom, as illustrated in FIGS. 4 and 8. Accordingly, as further illustrated in FIGS. 3 and 5 of the drawing, when the anchor line 20 is fully wound on the spool drum 18 of the spool 16 and the anchor 22 is seated in the anchor receptacles 23, the plug wings 25 are then grasped and the spool plug 24 tightened, such that the bearing face 27 seats against the front face of the corresponding spool flange 17, to prevent the anchor 22 from exiting the anchor receptacles 23 when the decoy 1 is stored.

Referring again to FIG. 4 of the drawing, in still another most preferred embodiment of the invention the crank 30 is characterized by an elongated crankshaft 32 having the crank tab 31 shaped in one end thereof and further including a crank handle 33 provided in offset relationship on the opposite end of the crankshaft 32. Furthermore, as illustrated in FIG. 4, in another most preferred embodiment of the invention, one leg of an L-shaped crankshaft bracket 34 is secured to the base 4 of the decoy body 2 by means of a mount screw 35 and the downwardly-extending leg of the crankshaft bracket 34 is characterized by a bracket opening 36. The bracket opening 36 is provided in alignment with the crank access opening 28 in the spool plug 24, for receiving the crankshaft 32 of the crank 30 and facilitate rotation of the crankshaft 32 by grasping the crank handle 33 and retracting the anchor 22 into the anchor receptacles 23. Alternatively, the L-shaped crankshaft bracket 34 can be injection-molded in place along with the decoy body 2 and the keel 5, as illustrated in FIG. 2.

Referring again to FIGS. 1, 3 and 5 of the drawings, in yet another most preferred embodiment of the invention the keel 5 is completely enclosed with the exception of the anchor line slot 21 provided in the bottom thereof, which anchor line slot 21 communicates with the anchor receptacles 23 to facilitate winding and unwinding the anchor line 20 on and from the spool drum 18 of the spool 16, respectively, as heretofore described. Accordingly, a pair of drain holes 15 are provided in each side of the keel 5, in order to flood the keel 5 and displace the air therein when the decoy 1 is floated and to help drain the keel 5 when the decoy 1 is retrieved from the water. Alternatively, both ends of the keel 5 can be open to facilitate a free flow of water through the keel 5, as desired.

In operation, and referring again to the drawing, the decoy with anchor keel of this invention is used as follows. The decoy is initially located above the surface of a water body, the plug wings 25 of the spool plug 24 are grasped and the spool plug 24 is rotated in the counterclockwise direction with respect to the spool housing 6, when viewed as illustrated in FIG. 3. Pressure applied to the plug wings 25 in the counterclockwise direction threadibly loosens the spool plug 24 in the spool housing 6 and removes the bearing face 27 of the spool plug 24 from the face of the companion spool flange 17, as illustrated in FIG. 7. The spool 16 is now freely rotatable on the plug hub 27a and the spool hub 13 inside the spool housing 6 and the weight of the anchor 22 causes the anchor 22 to deploy from the anchor receptacles 23 and unwind the anchor line 20, until the anchor 22 rests on the water bottom 37. When this occurs, the spool 16 stops, the plug wings 25 are grasped and the spool plug 24 is rotated in the clockwise direction and tightened to secure the bearing face 27 thereof against the companion spool flange 17 of the spool 16. This action prevents further free rotation of the spool 16 inside the spool housing 6. The decoy 1 is then floated on the water body and is anchored on the water bottom 37 with a sufficient length of the anchor line 20 extended from the spool 16 to maintain the decoy 1 in a desired location for hunting purposes. When it is desired to retrieve the decoy 1 and place it in a storage receptacle or container, the decoy 1 is grasped and lifted from the water and the spool plug 24 is again loosened as described above. The crankshaft 32 of the crank 30 is then inserted through the bracket opening 36 in the crankshaft bracket 34 and through the crank access opening 28 provided in the spool plug 24 and the plug hub 27a, such that the crank tab 31 engages the recessed crank tab slot 19 in the flange recess 17a of the spool 16. The crank handle 33 is then grasped and the crank 30 rotated in the clockwise direction as the spool plug 24 is viewed in FIGS. 3 and 4, to wind the anchor line 20 on the spool drum 18 of the spool 16 and recess the anchor 22 in the anchor receptacles 23, as illustrated in phantom in FIG. 3. The spool plug 24 is then again tightened as described above, to maintain the bearing face 27 of the spool plug 24 tightly against the companion spool flange 17 and prevent further rotation of the spool 16. The decoy 1 can then be stored without fear of entangling either the anchor line 20 or the anchor 22 with other anchors and anchor lines in other decoys.

It will be appreciated by those skilled in the art that the decoy of this invention offers a distinct improvement over prior art decoys in the prevention of entanglement of anchor lines and anchors during storage of the decoys in any type of container or receptacle, including burlap and nylon bags or sacks. Furthermore, the positioning of decoys in a precise location during hunting is facilitated, since a precise length of anchor line necessary to anchor the decoy in a specific location and water depth may be deployed from the rotating spool. This facility also minimizes underwater entanglement of the respective anchor lines while the decoys are in hunting configuration, a problem which frequently occurs in shallow water. Furthermore, fast, efficient retrieval of the decoys and deployment of the decoys in containers for storage purposes is easily facilitated.

Referring again to the drawing, it is further understood by those skilled in the art that the keel 5, spool 16 and spool plug 24 elements of the decoy 1 may be constructed of substantially any desired material, including wood, fiberglass and plastic, in non-exclusive particular. However, in a preferred embodiment of the invention, the keel 5 is injection-molded and is either attached to or formed integrally with the decoy body 2, according to the knowledge of those skilled in the art. Furthermore, the spool 16 and spool plug 24 are also preferably injection-molded from suitable molds, further according to the knowledge of those skilled in the art. The crank 30 can be likewise injection-molded from a plastic material or it may be constructed of a metal such as aluminum or steel, or even from fiberglass, as desired.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A decoy comprising: a shaped waterfowl decoy; substantially hollow keel means provided on the bottom of said decoy; a spool rotatably mounted with in said keel means, an anchor line wound on said spool and an anchor secured to said anchor line; and a plug threadably provided in said keel means substantially in alignment with said spool, whereby said spool is rotatable in said keel means and the anchor line is selectively unwound from said spool and wound on said spool responsive to loosening said plug in said keel means and the spool is prevented from rotating responsive to tightening said plug against said spool in said keel means.

2. The decoy of claim 1 further comprising a spool housing provided in said keel means and spool engaging means projecting inwardly of said spool housing in spaced relationship substantially at the axis of spin of said spool for rotatably supporting said spool in said keel means.

3. The decoy of claim 1 further comprising anchor receptacle means provided in said keel means for receiving said anchor when the anchor line is wound on said spool.

4. The decoy of claim 1 further comprising:
    (a) a spool housing provided in said keel means and spool engaging means. projecting inwardly of said spool housing in spaced relationship substantially at the axis of spin of said spool for rotatably supporting said spool in said keel means; and
    (b) anchor receptacle means provided in said keel means for receiving said anchor when the anchor line is fully wound on said spool.

5. The decoy of claim 1 further comprising a crank slot provided in said spool and crank means having a crank tab adapted to register with said crank slot for rewinding the anchor line on said spool responsive to rotation of said spool by manipulating said crank when said plug is loosened in said keel means.

6. The decoy of claim 1 further comprising:
    (a) a spool housing provided in said keel means and spool engaging means projecting inwardly of said spool housing in spaced relationship substantially at the axis of spin of said spool for rotatably supporting said spool in said keel means;
    (b) anchor receptacle means provided in said keel means for receiving said anchor when the anchor line is fully wound on said spool; and
    (c) a crank slot provided in said spool and crank means having a crank tab adapted to register with said crank slot for rewinding the anchor line on said spool responsive to rotation of said spool by manipulating said crank when said plug is loosened in said keel means.

7. The decoy of claim 5 further comprising a crank shaft bracket attached to the bottom of said decoy in spaced relationship with respect to said keel means and a bracket opening provided in said crank shaft bracket for receiving and stabilizing said crank means when said crank tab is inserted in said crank slot.

8. The decoy of claim 7 further comprising:
    (a) a spool housing provided in said keel means and spool engaging means projecting inwardly of said spool housing in spaced relationship substantially at the axis of spin of said spool for rotatably supporting said spool in said keel means; and
    (b) anchor receptacle means provided in said keel means for receiving said anchor when the anchor line is fully wound on said spool.

9. The decoy of claim 1 further comprising at least one ballast means provided in said keel means for stabilizing said decoy in an upright position when said decoy is floating.

10. The decoy of claim 6 furhher comprising:
    (a) a crank shaft bracket attached to the bottom of said decoy in spaced relationship with respect to said keel means and a bracket opening provided in said crank shaft bracket for receiving and stabilizing said crank means when said crank tab is inserted in said crank slot; and
    (b) at least one ballast means provided in said keel means for stabilizing said decoy in an upright position when said decoy is floating.

11. A decoy having an anchor keel comprising a shaped waterfowl decoy having a substantially flat bottom for floating said decoy on a water body; a hollow keel having an open bottom provided on said bottom of said decoy; a generally cylindrical spool housing provided in said keel and a spool rotatably mounted in said spool housing; a length of anchor line normally wound on said spool, with one end of said anchor line attached to said spool and the opposite end of said anchor line extending through said open bottom of said keel and an anchor attached to said opposite end of said anchor line; and a threaded plug threadably seated in one end of said spool housing substantially in alignment with said spool, whereby said spool is prevented from rotating in said spool housing when said plug is tightened in said spool housing against said spool and said spool is allowed to rotate in said spool housing when said plug is loosened in said spool housing and spaced from said spool, for selectively securing said anchor in said keel and deploying said anchor from said keel in said water body.

12. The decoy of claim 11 further comprising anchor receptacle means provided in said keel for receiving said anchor when the anchor line is wound on said spool.

13. The decoy of claim 11 further comprising a crank slot provided in said spool and crank means having a crank tab adapted to register with said crank slot for rewinding the anchor line on said spool responsive to rotation of said spool by manipulating said crank when said plug is loosened in said keel.

14. The decoy of claim 11 further comprising a crank shaft bracket attached to the bottom of said decoy in spaced relationship with respect to said keel and a bracket opening provided in said crank shaft bracket for receiving and stabilizing said crank means when said crank tab is inserted in said crank slot.

15. The decoy of claim 11 further comprising:
(a) anchor receptacle means provided in said keel for receiving said anchor when the anchor line is fully wound on said spool;
(b) a crank slot provided in said spool and crank means having a crank tab adapted to register with said crank slot for rewinding the anchor line on said spool responsive to rotation of said spool by manipulating said crank when said plug is loosened in said keel means; and
(c) a crank shaft bracket attached to the bottom of said decoy in spaced relationship with respect to said keel and a bracket opening provided in said crank shaft bracket for receiving and stabilizing said crank means when said crank tab is inserted in said crank slot.

16. The decoy of claim 15 further comprising at least one ballast means provided on said keel for stabilizing said decoy in an upright position when said decoy is floating.

17. The decoy of claim 16 wherein said at least one ballast means is two strips of lead attached to said keel in spaced relationship.

18. A decoy having an anchor keel comprising a shaped waterfowl decoy having a substantially flat bottom for floating said decoy on a water body; a hollow keel having an open bottom provided on said bottom of said decoy; a pair of curved anchor receptacles attached to said keel at said open bottom in spaced relationship; a generally cylindrical spool housing provided in said keel and a spool rotatably mounted in said spool housing; a length of anchor line normally wound on said spool, with one end of said anchor line attached to said spool and the opposite end of said anchor line extending through said open bottom of said keel and an anchor attached to said opposite end of said anchor line, said anchor adapted to seat in said anchor receptacles when said anchor line is wound on said spool; and a threaded plug threadibly seated in one end of said spool housing substantially in alignment with said spool, whereby said spool is prevented from rotating in said spool housing when said plug is tightened against said spool in said spool housing and said spool is allowed to rotate in said spool housing when said plug is spaced from said spool as said plug is loosened in said spool housing, for selectively securing said anchor in said anchor receptacles and deploying said anchor from said anchor receptacles to anchor said decoy on the water body.

19. The decoy of claim 18 further comprising a crank slot provided in said spool and crank means having a crank tab adapted to register with said crank slot for rewinding the anchor line on said spool responsive to rotation of said spool by manipulating said crank when said plug is loosened in said keel.

20. The decoy of claim 19 further comprising a crank shaft bracket attached to the bottom of said decoy in spaced relationship with respect to said keel and a bracket opening provided in said crank shaft bracket for receiving and stabilizing said crank means when said crank tab is inserted in said crank slot.

21. The decoy of claim 20 further comprising at least two strips of ballast carried by said keel in spaced relationship for stabilizing said decoy on said water body.

* * * * *